US012143521B1

(12) United States Patent
Subramaniam

(10) Patent No.: US 12,143,521 B1
(45) Date of Patent: Nov. 12, 2024

(54) SINGLE VERSION OF SECURED CUSTOMER RECORD USING BLOCK CHAIN

(71) Applicant: WELLS FARGO BANK, N.A., San Francisco, CA (US)

(72) Inventor: Thiruchenthil Subramaniam, Concord, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 253 days.

(21) Appl. No.: 17/839,918

(22) Filed: Jun. 14, 2022

(51) Int. Cl.
*H04L 9/00* (2022.01)
*H04L 9/08* (2006.01)
*H04L 9/32* (2006.01)

(52) U.S. Cl.
CPC .............. *H04L 9/50* (2022.05); *H04L 9/0819* (2013.01); *H04L 9/32* (2013.01)

(58) Field of Classification Search
CPC ............ H04L 9/50; H04L 9/0819; H04L 9/32
USPC .......................................................... 713/168
See application file for complete search history.

(56) References Cited

U.S. PATENT DOCUMENTS

| 10,558,825 | B1 | 2/2020 | Suh | |
| 2016/0162897 | A1* | 6/2016 | Feeney | H04L 9/3236 |
| | | | | 705/71 |
| 2018/0025365 | A1* | 1/2018 | Wilkinson | G06Q 30/0201 |
| | | | | 705/7.29 |
| 2019/0044917 | A1* | 2/2019 | Mork | H04L 63/0428 |
| 2019/0057115 | A1* | 2/2019 | Liu | H04L 9/3247 |
| 2021/0184835 | A1* | 6/2021 | Cao | H04L 9/0637 |
| 2021/0234702 | A1* | 7/2021 | Bekiyants | B29D 35/0054 |
| 2023/0245137 | A1* | 8/2023 | Mccullough | G06Q 30/0185 |
| | | | | 705/318 |
| 2023/0401526 | A1* | 12/2023 | Hu | G06Q 10/0835 |

OTHER PUBLICATIONS

Zhuang et al., "A Patient-Centric Health Information Exchange Framework Using Blockchain Technology," IEEE Journal of Biomedical and Health Informatics, Aug. 2020, pp. 2169-2176, vol. 24, No. 8, IEEE.

* cited by examiner

*Primary Examiner* — Badri Narayanan Champakesan
(74) *Attorney, Agent, or Firm* — Kilpatrick Townsend & Stockton LLP

(57) ABSTRACT

Systems and methods for securing and adding sensitive information in a block chain are disclosed. One disclosed method includes receiving private user information, validating the private user information, generating a user block on a block chain, generating a private user key and an enterprise key, receiving a request from a user for a service, authenticating the private user key and enterprise key through consensus, hashing a block with service information, and linking the service block to the user block.

16 Claims, 5 Drawing Sheets

SINGLE VERSION OF SECURED CUSTOMER RECORD USING BLOCK CHAIN

TECHNICAL FIELD

The present disclosure is generally related to block chain technology. More particularly, the present disclosure is related to securing sensitive user information in enterprises through block chain technology.

BACKGROUND

Businesses generally maintain records of the businesses' past and current customers. Maintaining customer records is especially important for businesses providing services and products to recurring customers. Due to the complex nature of maintaining customer records, businesses sometimes make mistakes in maintaining customer records. For example, if a business has multiple divisions, a failure to coordinate between the divisions of the business may result in multiple records being generated for a customer. Further, if the business lacks protective measures to prevent employees from manipulating customer records, employees might inadvertently add or remove information to a customer's record. This may result in additional services being added to a customer's record without the consent or knowledge of the customer.

SUMMARY

According to certain embodiments, a method according to the present disclosure may comprise receiving user information associated with a user; validating the user information; generating, based on the user information, a user block on a private block chain for user products; generating a private user key associated with the user and the private block chain; generating an enterprise key; receiving, from the user, a request for a service; authenticating the private user key and the enterprise key by a consensus protocol of the private user key and enterprise key; hashing the service information with the private user key; and linking the service information with the user block.

According to another embodiment, the present disclosure includes a non-transitory computer readable medium comprising instructions that when executed by one or more processors cause the one or more processors to: receive user information associated with a user; validate the user information; generate, based on the user information, a user block on a private block chain for user products; generate a private user key associated with the user and the private block chain; generate an enterprise key; receive, from the user, a request for a service; authenticate the private user key, and the enterprise key by a consensus protocol of the private user key and enterprise key; hash the service information; and link the service information with the user block.

According to another embodiment, a system of the present disclosure comprises one or more processors; and a memory that stores instructions that, when executed by the one or more processors, cause the one or more processors to: receive user information; validate user information; generate a user block on a private block chain for user information and user services; generate a private user key; generate an enterprise key; receive a request from a user for a service; authenticate the private user key, and the enterprise key by a consensus protocol of the private user key and enterprise key; hash the service information; and link the service information with the user block.

These illustrative examples are mentioned not to limit or define the limits of the present subject matter, but to provide an example to aid understanding thereof. Illustrative examples are discussed in the Detailed Description, and further description is provided there. Advantages offered by various examples may be further understood by examining this specification and/or by practicing one or more examples of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Figure 1:
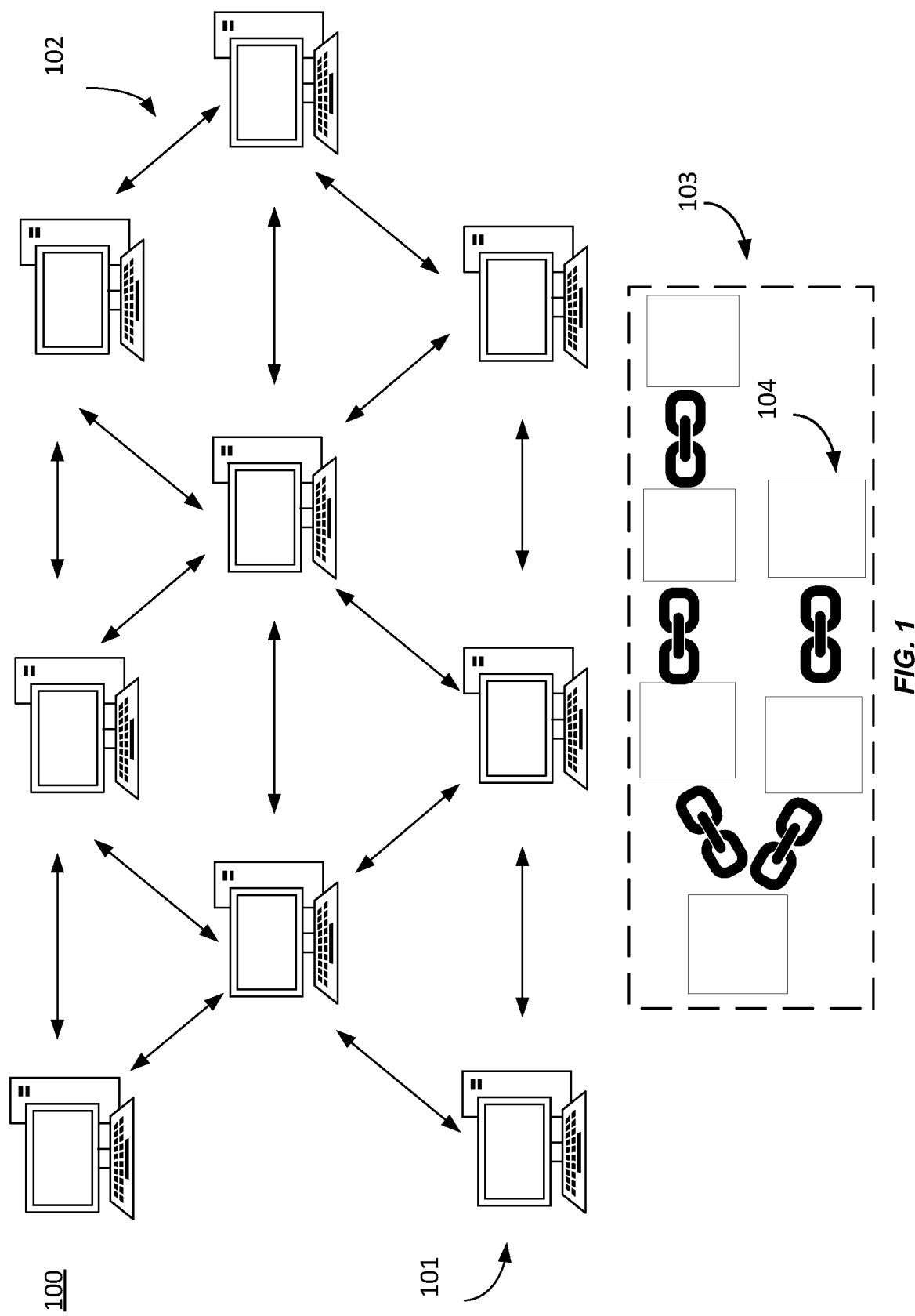
FIG. 1 illustrates a block diagram comprising computing devices managing a block chain.

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure include modifications and variations as come within the scope of the appended claims and their equivalents.

Block chain technology allows for secure decentralized databases to store transactions and other information. When the enterprise is in control of a centralized database of customer records, the enterprise controls validation of customer records, allowing the enterprise to add, remove, or manipulate information in customer records without the knowledge or consent of the customer. This creates a power imbalance between the customer and the business. If the customer did not maintain the customer's own records for transactions or information given to the business, the customer may not realize they are a victim of the enterprise's mistake or fraud.

Block chain technology allows information to be stored on a distributed, immutable digital ledger. The digital ledger is comprised of blocks that are used to record information. The immutability of a block chain distributed ledger is a result of peer-to-peer network management of block chain technology. Multiple computing devices manage and authenticate actions occurring on block chain technology. Because actions on block chain technology are managed and authenticated across multiple devices, the digital ledger is difficult to manipulate. Transactions may be added on the digital ledger, but because transactions on the digital ledger are duplicated across multiple computing devices, deleting and manipulating past transactions is extremely difficult.

Various aspects described herein relate to securing user information and records from unwanted addition of transactions, such as adding unwanted products or services. The aspects provided herein prevent unwanted addition of products or services to a user's account, as well as preventing fraudulent use of a user's account. In this specification, the terms user and customer are used interchangeably.

In one illustrative embodiment of the present disclosure a bank sets up a block chain to store user account information including transaction records related to products and services provided by the bank for the user (in this example "transactions"). The user initially provides the bank with relevant user information associated with the user such as the user's social security number, address, birthday, a scan of the user's passport or driver's license, phone number, biometric data, salary data, marital status, and other relevant personal information. The bank validates the user information by checking to make sure that the user information is accurate. The bank validates user identity by requesting a report on the user's information from a credit bureau, or independently validates a user's identity by reviewing the user's information. When the bank determines that the personal information provided by the user is accurate, the bank hashes a user block on the block chain. A third-party authentication application then generates a private user key associated with the user and the block chain.

The user block serves as a starting point on the block chain linking user transactions to the user's account information. The user has viewing access of the information on the block chain related to the user's account information and transactions through a banking application. Allowing the bank user viewing access of the block chain allows the user to confirm that the account information and transactions are accurate and not fraudulent. Further, because records on block chain technology are immutable, the user is assured that the viewable records have not been altered.

The present disclosure improves upon current systems of collecting and storing user information by providing additional security and visibility to the stored user information and transactions associated with the user. The immutability of the block chain makes the addition of transactions or changes in information visible to the user. The immutability of the block chain ensures that the user can always confirm an accurate transaction history because changes to the block chain result in the addition of new blocks instead of alteration of prior blocks.

The block chain is designed such that transactions are recorded after the transaction complies with a consensus protocol. An example consensus protocol requires that a private user key and the bank's enterprise key be authenticated by a third-party authentication application confirming that both the bank and the user agree to a transaction before the transaction is recorded on the block chain. The user enters the user's username and password into the third-party authentication application to generate a private user key, and a bank worker enters in credentials such as a username and password, or other identifying information, into a third-party authentication application to generate an enterprise key. The third-party authentication application confirms the identity of the private user and the bank worker by their submitted credentials. The third-party authentication application may also use two-factor identification, including requiring a code sent over SMS to the user be entered in order for the private user to confirm the user's identity, in addition to a username and password.

The present disclosure further improves upon current systems of collecting and storing user information by providing additional security to the addition of transactions to a user's account. The consensus protocol prevents transactions from being improperly added to the user's account by requiring that both the user and the enterprise consent to added transactions. Some example embodiments provide additional security by including a third-party authentication application so that the enterprise is unable to gain access to a user's private user key to add a transaction to a user's account without the user's consent. This provides consumer protection against fraudulent or mistakenly added transactions to a user's account by an enterprise.

The enterprise key and the private user key are sent to a peer-to-peer network of computers. When both the enterprise key and the private user key indicate that both parties consent to the transaction being recorded on the block chain, the computers on the peer-to-peer network hash a service block representing the transaction on the block chain and link the service block to the user block. Included in the service block is information related to the transaction. For example, the service block may include service and product information as well as a timestamp of when the service block associated with the transaction is linked to the user block chain directly, or linked to a previous service block linked to the user block chain.

The first service block added to the user's account is linked to the user block. Additional service blocks are linked to a preceding service block in sequence of when the transaction occurred to form a chain of service blocks. For example, if over the course of a year, the user opened an account in January, opened a savings account in June, and took out a home loan in December, the user block chain would begin with a user block followed by a service block representing the savings account, which would be followed by a service block representing the home loan.

When the service block associated with the transaction has been added to the user block chain, computing nodes generate a user view of the transaction for display on a computing device. The transaction is viewable to the user through an application on the user's device, i.e. a phone, computer, tablet, or other device.

Illustrative Example of a Method for Securing User Information

In one illustrative example of the present disclosure, a customer may decide to add an additional service to a checking account. The customer communicates a request to the bank that the customer would like to open a checking account. Other services include opening a certificate of deposit (CD), savings account, credit card, taking out a loan, or other financial service.

The bank validates the legitimacy of the customer's request prior to adding the checking account to the customer's account. For example, the bank validates that the individual making the request is the customer, and that the customer is authorized to request the checking account be added to the customer's account. Further, the bank determines whether the customer qualifies for the requested service by checking the customer's credit, current services provided to the customer, and other information related to the customer.

When the bank has approved the customer's request to add the checking account, a private user key and enterprise key are generated by the bank. Alternatively, the private user key and enterprise key are generated by a third-party authentication application. In further examples, the private user key, is generated by an application on the customer's personal device, and the enterprise key is generated by the bank. The keys may be set to expire after a set amount of time if not authenticated, or they may be only good for a specific transaction.

In the present example, if the value of the enterprise key and the private user key match, the peer-to-peer network of computers hashes a block with information related to the service being added to the account and links the block to the block chain. The individual computers in the peer-to-peer network store the information regarding the added block in memory, establishing the distributed ledger. Computing nodes generate a user view of the user services for display on a computing device, and the customer is able to view the added checking account.

Illustrative Example of a Block Chain for Securing User Information

FIG. 1 illustrates an example block chain system 100 for storing and protecting user information on a block chain 103. The blocks 104 of the block chain 103 are user blocks and service blocks. In this example the block chain 103 is managed by a peer-to-peer network of computers 101 which are configured to communicate with each other. Communication 102 between the computers 101 is used to establish consensus for changes in a distributed ledger of the block chain 103 by comparing information saved.

The user blocks include personal information of the user such as: birthday, social security number, phone number, address, biometric data, salary data, marital status, or other personal information. The user block also includes metadata regarding generation of the user block, such as a name of a worker approving the user block, date of hashing, time of hashing, a division of enterprise approving hashing, and other information.

The service blocks include information regarding the service provided by the enterprise. The service blocks include information such as: a name of a worker approving addition of the service to the user block, a date of addition, a time of addition, or a division of an enterprise approving addition.

The block chain system 100 may integrate user blocks on an enterprise wide block chain, or each user block may be a part of a user specific block chain. The enterprise wide block chain is a block chain consisting of multiple user blocks and service blocks for multiple users of the enterprise. Alternatively, user information is stored on individual block chains, with one user per block chain.

The computers 101 communicate to other computing devices through a peer-to-peer network. The individual computers share a distributed ledger, which is updated by the computers following a consensus protocol. Each computer stores a copy of the distributed ledger, or part of the distributed ledger and the computers establish by a consensus protocol updates to the distributed ledger.

Figure 2:
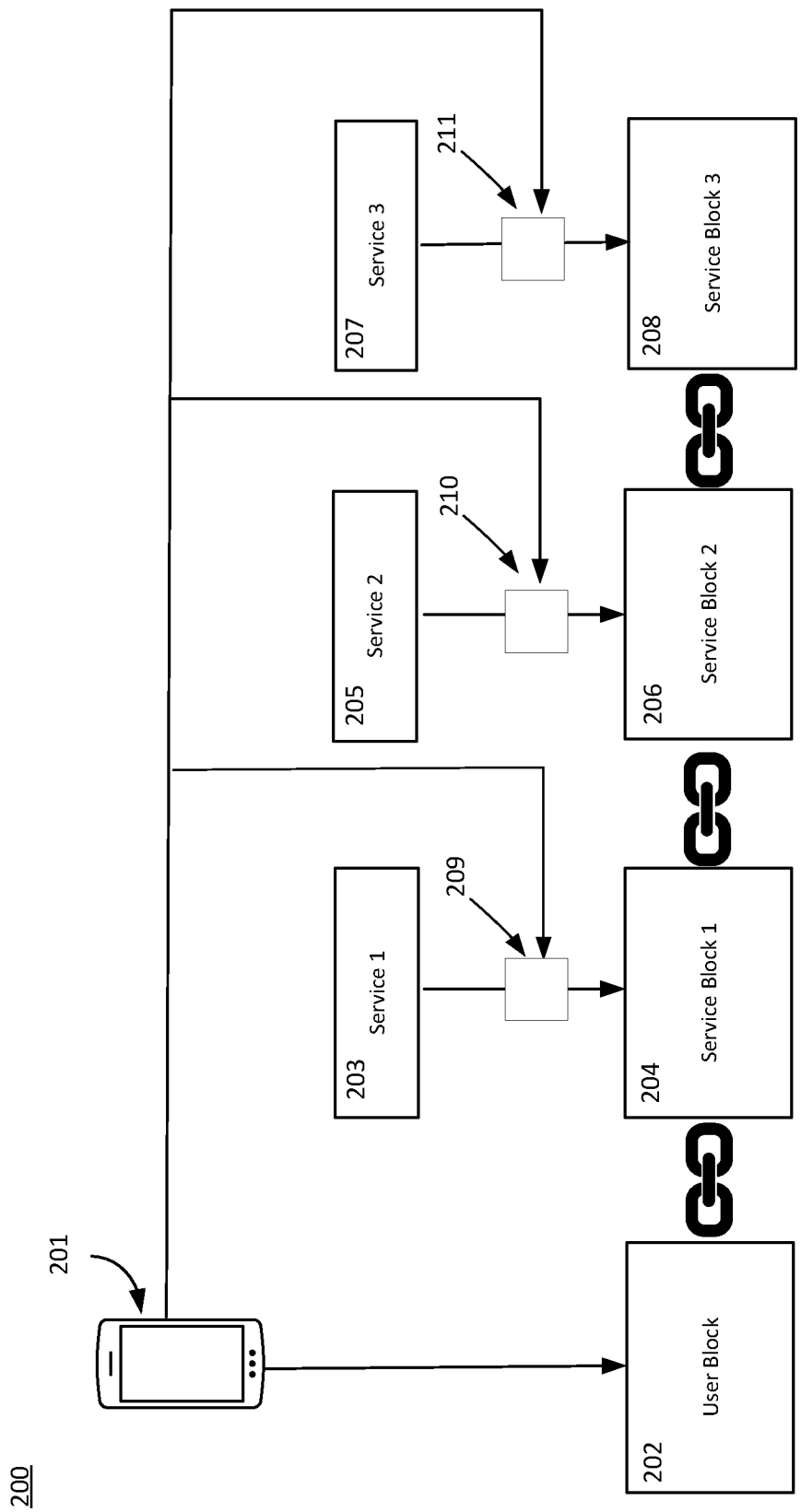
FIG. 2 illustrates a block diagram comprising a user block, product blocks, user device, and products provided by an enterprise, wherein the products are added to the user block when a private user key and enterprise key are authenticated.

FIG. 2 illustrates an example block chain system 200 for storing and protecting user information on a block chain. The block chain comprises a user block 202 and service blocks 204, 206, and 208. In this example, the block chain system 200 includes a user computing device 201, services 203, 205, and 207 to be added to the block chain when authenticated at 209 210 211.

In this example, a user is requesting that a bank add multiple services 203 205 207 to the user's account, such as a savings account, checking account, and credit card. The user uses a user computing device 201 to send a private user key to the peer-to-peer network of computers of the bank providing the block chain. The user requests that the savings account, checking account, and credit card be added by sending the private user key to the peer-to-peer network of computers, and the peer-to-peer network of computers authenticates the private user key by a consensus protocol. Consensus may be established when the private user key and the enterprise key match each other and the computers on the peer-to-peer network agree that the private user key and enterprise key are valid.

For example, when the private user key generated by the third-party authentication application is the same value as the enterprise key, the private user key and the enterprise key are authenticated and the service block is added to the block chain. If the values are different, then the keys are not authenticated, and the service block is not added to the block chain. Other examples of consensus protocol include sending the private user key to a computer on the peer-to-peer network. The computer runs a computation using values representing the private user key or enterprise key to determine if the private user key or enterprise key is valid. Where the private user key and the enterprise key are strings representing numerical values, the private user key and the enterprise key may be used as inputs for the computation. For example, in one embodiment the computer runs a computation using the enterprise key as an input and compares the value to the private user key. If the values match, then the computer sends requests to other computers on the peer-to-peer network to run the same computation using the enterprise key as an input and compare the value to the private user key to determine whether the values of the computation on the enterprise key and the private user key match. In such an embodiment, if a majority of the computers, or a preset amount of the computers on the peer-to-peer network agree that the values match, the transaction is authenticated. Further, in some embodiments, authentication by the consensus protocol may occur at the enterprise (in this example, a bank), at a third-party authentication application, or at another location.

In this example, a user computing device 201 sends the private user key to be authenticated at 209 210 211 by the peer-to-peer network of computers. The private user key and the enterprise key are authenticated by the consensus protocol and the service block 204 206 208 is hashed with service information. The service block is hashed using a hashing function. Data related to the service serves as inputs into a hash function. The hash function generates a hash value based on the inputs into the hash function, and the hash value is unique to the inputs. Because the hash value is unique, the hash value is used to indicate a location of the block on the block chain and allows the blocks to be linked. The hash value of the previous service block is added to the newest service block to indicate the order of the service blocks on the block chain, thereby linking the service blocks and the user block. The values of the hashes and data related to the service blocks and the user blocks are stored on multiple computers in the peer-to-peer network of computers.

Further, the separate services 203 205 and 207 are independently authenticated and hashed. Alternatively, multiple services are authenticated and hashed together, where multiple services are requested concurrently. In one example of the present disclosure, where the requests for a savings account, checking account, and credit card are made separately, separate private user keys and separate enterprise keys are generated and authenticated. Requests for multiple services made in the same request may be authenticated by a single private user key and single enterprise key. The multiple services may be recorded in a single service block, or services may be recorded on separate service blocks.

The user is able to view the added services on an application on the user computing device. Computing nodes (not shown) are configured to read the user block 202 and service blocks 204 206 208. The computing nodes generate a user view of user services on the block chain. The user view is generated on the user's device, or is generated at another location and displayed to the user.

Figure 3:
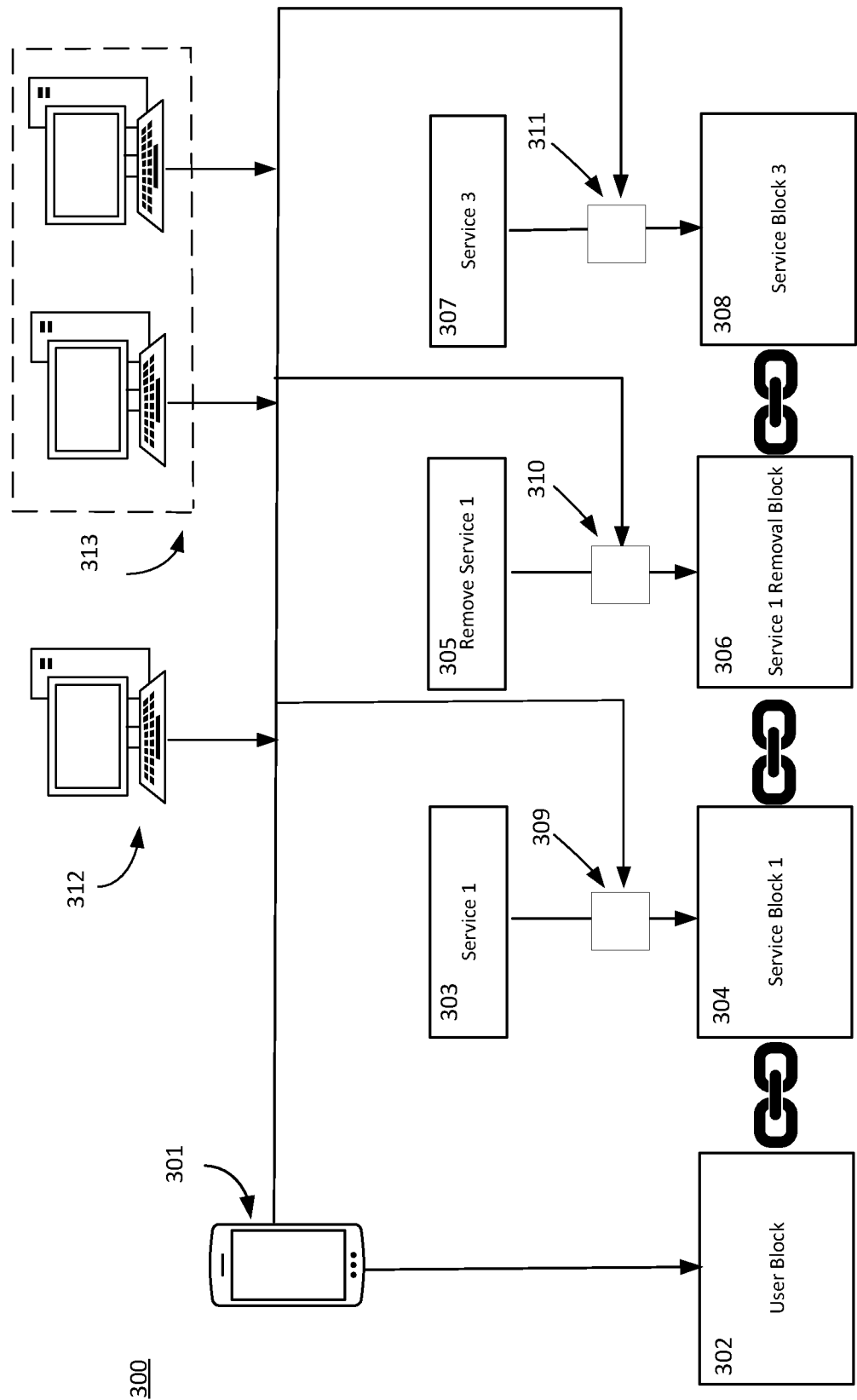
FIG. 3 illustrates a block diagram comprising a user block, product blocks, user device, and products provided by an enterprise, wherein the products are added to the user block when a private user key, enterprise key, and one or more other keys are authenticated.

Similar to FIG. 2, FIG. 3 illustrates an example block chain system 300 for storing and protecting user information on a block chain. In this example, the user is a customer of the bank with multiple services associated with the user's account, and the user requested the removal of a service, such as closing out a credit card.

The block chain comprises a user block 302, service blocks 304 and 308 and a removal block 306. The block chain system 300 includes a user computing device 301, one or more enterprise devices 312 and 313, and services 303 and 307 to be added to the block chain when authenticated 309 and 311. The example further includes a removal determination 305 that when authenticated 310 adds a removal block 306 to the block chain.

A third-party authentication application on the user's computing device 301 generates a private user key and an enterprise generates an enterprise key. One or more additional keys are generated by the enterprise, a division of the enterprise, or other entity. The private user key, the enterprise key, and the one or more additional keys may also be generated by a third-party authentication application or other source. In some embodiments, the keys may expire after a set period of time, or expire after a transaction.

In one embodiment, a user computing device 301 sends the private user key to be authenticated 309 311. The private user key, enterprise key, and the one or more additional keys are authenticated by a consensus protocol and the service block 304 308 is hashed with service information.

Similar to FIG. 2, authentication may be performed by or occur at one or more locations including the enterprise, a third-party authentication application, or at another location. In some example embodiments, authentication occurs when the private user key, enterprise key, and the one or more additional keys have the same value. If the values are different, then the keys are not authenticated, and the service block is not added to the block chain.

The removal determination 305 is made by the user, the enterprise, a division of the enterprise, or another entity with authority to remove user services. When a removal determination 305 is made, the decision is authenticated 310. The decision is authenticated through a consensus protocol involving the private user key, enterprise key, and one or more additional keys. Consensus protocol refers to the rules that a peer-to-peer network of computers or other system controlling the block chain follows to add additional blocks to the block chain and to determine that the block chain is accurate. In one embodiment, in order to add blocks to the block chain, the peer-to-peer network of computers determine that the private user key, enterprise key, and the one or more additional keys are the same value. When the keys are the same value, and a predetermined amount of the computers on the peer-to-peer network agree that the keys are the same value, a block may be added to the block chain. Consensus protocol is also followed when two computers on the peer-to-peer network contradict each other, in order to determine which computer accurately stores the block chain. For example, when one computer's memory is corrupted and displays false information, the false information is not added to the block chain, because the other computers on the peer-to-peer network of computers identify contradictions from the corrupted memory. When a predetermined number of the computers on the peer-to-peer network agree on the information in the block chain, consensus has been reached. So for the example of corrupted computer memory, the other computers on the peer-to-peer network of computers disagree with the corrupted computer memory, and would not add the information from the corrupted computer memory, which maintains the accuracy of the block chain.

In this example, the bank makes a determination whether to close out the user's credit card. The bank may agree with the user and close out the credit card, or if the bank determines that the credit card has an outstanding balance or for other business related reasons, may refuse to close out the credit card. Where the bank agrees to close out the credit card, the bank sends an enterprise key and a third key to the peer-to-peer network of computers to be authenticated by the consensus protocol. Where the bank disagrees (not shown) the bank does not send the enterprise key to be authenticated, and does not add the removal block 306.

Requiring a third key, or additional keys beyond the third key, for authentication allows for different divisions of the enterprise to provide input as to whether services should be added or removed. For example, where a bank is closing out a credit card for a user, the bank may have a credit department that must agree with decisions of other divisions of the bank before closing out the credit card. The credit department would indicate agreement to close out the credit card by sending the third key to be authenticated.

In some embodiments, the third key is also used to allow other entities or individuals to provide input into whether an additional services are added or removed from a user account. For example, if an account is set up for a beneficiary of a trust, the private user key and the third key ensures that decisions to add or remove services to the account must be approved by multiple trustees or the beneficiary and a trustee, etc.

A hash, also referred to as a hash value, is a string representing a value which is generated by a hashing function. In some embodiments, a hash can be various lengths, including 18 characters or more. Hashes are unique to the inputs of the hashing function and are used to identify locations of blocks on the block chain.

In examples where the bank agrees to remove the service (i.e. close out the credit card) the removal block 306 is hashed with removal information. The removal information includes information about the service removed, and removal information such as a name of a worker approving the user block, date of hashing, time of hashing, a division of enterprise approving hashing, or other information.

Computing nodes (not shown) are configured to read the user block 302, removal blocks 306 and service blocks 304 308. The computing nodes generate a user view of unremoved user services on the block chain and remove removed services from user view. The computing nodes may be configured to generate a user view of removed services as well, such as generating a list of removed services. The user view is generated on the user's device, or is generated at another location and displayed to the user.

Figure 4:
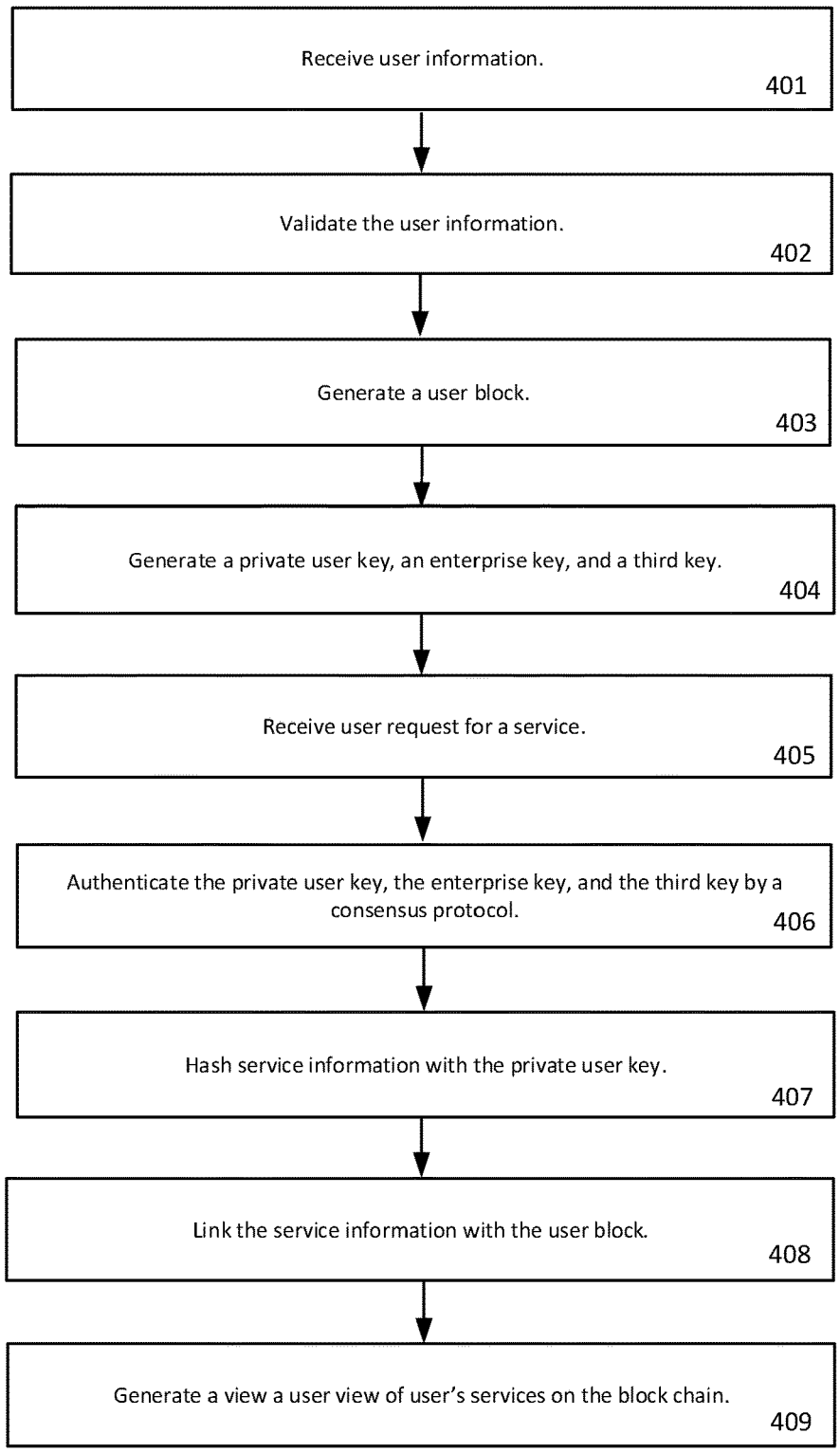
FIG. 4 illustrates an example flow chart for a method of adding a user block and user services to a block chain.

Illustrative Example of a Method for Securing User Information in a Block Chain FIG. 4 illustrates an example flow chart for a method of adding a user block and user services to a block chain.

The method 400 begins at 401 when an enterprise or other entity receives user information. For example, a user requests that the bank provide the user with a mortgage loan. Where the user is a new customer, and does not have a pre-existing account with the bank. Where the user is a returning customer, and a user block already has been generated for the user, the method may begin at step 404 or 405.

The user provides personal information to the bank regarding the user's identity and other relevant information to receive the mortgage loan from the bank. The user information is validated by the enterprise or other entity at step 402. Validation may include the bank running a credit report on the user or other forms of validating a user's identity to prevent fraudulent generation of a user block. The bank validates accuracy of user information by requiring evidence from the user indicating the user information is valid. In some embodiments, the required evidence may include, for example, a copy of a birth certificate, copy of a driver's license, copy of another a pay stub, biometric information verification, a background check, references, or other evidence of identity or evidence validating user information.

The bank generates a user block including validated user information in step 403. In some examples, the user block is a branch on a block chain with multiple users. In other examples, the user block is part of a block chain for an individual user.

In step 404, a private user key, an enterprise key, and a third key may be generated by the bank. In some examples, more than three keys are generated. The enterprise key, the third key, and other additional keys may also be generated at the enterprise or at a third-party authentication application. Other examples only generate a private user key, and an enterprise key, or generation of keys occurs at a third-party authentication application.

In step 405, the bank or other entity receives a request from a user for a product or service, such as the request for the mortgage loan. Content of the user's request may vary. For example, the request may include the user's private user key, or a separate step may include the user sending the private user key to the enterprise to be authenticated. In some examples, the bank receives the user request for a service and an enterprise key, private user key, and third key are then generated, putting step 405 before step 404.

Further, in step 406 the enterprise or other entity authenticates the generated keys of step 404 by a consensus protocol. Consensus protocol may include comparing the values of the enterprise key, private user key, and the third key, and if all keys match a specific value, the keys are authenticated.

When the private user key, enterprise key, and additional keys are authenticated, the user requested service is added to the user block chain. The enterprise or other entity hash service information with the private user key in step 407 and link the service information with the user block in step 408. Linking occurs when hash values of a preceding block in the user block chain are added to a service block after the service block has been hashed. Alternatively, the linking step 408 and hashing step 407 may be combined in the same step, where the hash value of the preceding block is included as data when hashing the service block.

In step 409, computing nodes generate a user view of user's services on the block chain. Users are able to view their active services through an application, browser, computer, or other device. The user view is generated for display to the user through a browser, application, or user device. The generated user view may include service information such as a name of a worker approving addition of the service to the user block, a date of addition, a time of addition, or a division of an enterprise approving addition. The user is able to view the addition of the mortgage loan to the user's account.

Illustrative Example of a Method for Removing Services from a User Record

Figure 5:
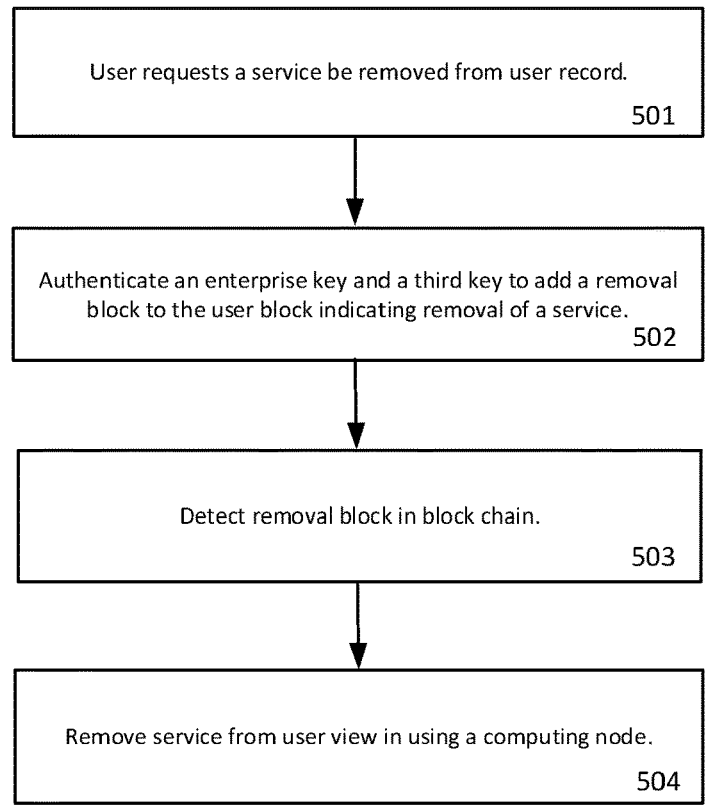
FIG. 5 illustrates an example flow chart for a method of removing user view of removed services.

FIG. 5 illustrates an example flow chart for a method of removing user view of removed services.

The method 500 begins at 501 when a user requests a service be removed from the user's account. For example, a customer of a bank wishes to close out a high-yield savings account (HYSA). The customer begins by requesting that the bank close out the HYSA. In alternative examples, the method 500 may begin with a determination to remove a user service by the enterprise, division of the enterprise, or another entity.

For example, the bank decides that providing HYSAs is no longer profitable, and wishes to close out any outstanding accounts. The bank does not require a request from a user to determine to stop providing a service. An enterprise may determine to otherwise terminate the service for a user for various reasons such as the user's breach of the terms of service, fraud on the part of the user, or outstanding bills or debt.

In step 502 the enterprise key and one or more additional keys are authenticated to add a removal block to the user record. The one or more additional keys may be keys for divisions of the enterprise or individuals in the enterprise. For example, the bank deciding to remove the HYSA may require approval from a manager and the worker removing the service from an account. In some embodiments, the manager and worker have separate keys, which must be separately authenticated.

Alternative examples may require authenticating the private user key, where the user requests removal of a service from user record. Requiring a private user key where the user requests removal prevents tampering with the user record by unauthorized users. However, a private user key may not be needed where the determination to remove the service is made by the enterprise.

In step 503 the removal block is detected in the block chain and in step 504 the service block associated with the removal block is removed from user view by a computing node. In additional examples, the computing nodes track what services have been removed from the user record. The removed services may be displayed to the user under a removed services tab. A message is sent to the user to inform the user that a service has been removed from the user record.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined.

Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure. While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A method comprising:
  receiving user information associated with a user;
  validating the user information;
  generating, based on the user information, a user block on a private block chain for user products;
  generating a private user key associated with the user and the private block chain;
  generating an enterprise key;
  receiving, from the user, service information comprising a request for a service;
  authenticating the private user key and the enterprise key by consensus of the private user key and enterprise key;
  hashing the service information with the private user key;
  linking the service information with the user block;
  generating a user view of one or more of the user's services on the private block chain; and
  adding a removal block to the user block indicating that the service has been removed.

2. The method of claim 1, further comprising generating a third key used in combination with the user key and enterprise key to authenticate the request for a service.

3. The method of claim 1, wherein an authentication application generates the private user key.

4. The method of claim 1, wherein the private user key and enterprise key are generated for individual transactions and expire after a set period of time.

5. The method of claim 1, wherein the hashed service information comprises one or more of: a name of a worker approving addition of the service to the user block, a date of addition, a time of addition, or a division of an enterprise approving addition.

6. The method of claim 1, wherein the method further comprises authenticating the enterprise key before removing a service.

7. The method of claim 1, wherein the method further comprises authenticating the enterprise key and a third key to add an additional removal block to a user block.

8. The method of claim 1, wherein the method further comprises generating a user view of unremoved user services using a computing node.

9. A non-transitory computer readable medium comprising instructions that when executed by one or more processors cause the one or more processors to:
  receive user information associated with a user;
  validate the user information;
  generate, based on the user information, a user block on a private block chain for user products;
  generate a private user key associated with the user and the private block chain;
  generate an enterprise key;
  receive, from the user, service information comprising a request for a service;
  authenticate the private user key, and the enterprise key by consensus of the private user key and enterprise key;
  hash the service information;
  link the service information with the user block;
  generate a user view of one or more of the user's services on the private block chain; and
  add a removal block to the user block indicating that the service has been removed.

10. The non-transitory computer readable medium of claim 9, further comprising program code that when executed by one or more processors causes the one or more processors to: generate a third key, wherein the third key is used with the user key, and the enterprise key to authenticate a user request for a service.

11. The non-transitory computer readable medium of claim 9, wherein a third-party authentication application generates the private user key.

12. The non-transitory computer readable medium of claim 9, wherein the private user key and enterprise key are generated for individual transactions and expire after a set period of time.

13. The non-transitory computer readable medium of claim 9, wherein the hashed service information comprises one or more of: a name of a worker approving addition of the service to the user block, date of addition, time of addition, or a division of enterprise approving addition.

14. The non-transitory computer readable medium of claim 9, further comprising program code that when executed by one or more processors causes the one or more processors to: authenticate the enterprise key and a third key to remove services.

15. The non-transitory computer readable medium of claim 9, further comprising program code that when executed by one or more processors causes the one or more processors to: generate a user view of unremoved user services using a computer node.

16. A system comprising:
  one or more processors; and
  a memory that stores instructions that, when, executed by the one or more processors, cause the one or more processors to:
  receive user information;
  validate user information;
  generate a user block on a private block chain for user information and user services;
  generate a private user key;
  generate an enterprise key;
  receive service information comprising a request from a user for a service;
  authenticate the private user key, and the enterprise key by consensus of the private user key and enterprise key;
  hash the service information;

link the service information with the user block;
generate a user view of one or more of the user's services on the private block chain; and
add a removal block to the user block indicating that the service has been removed.

\* \* \* \* \*